(12) United States Patent
Song

(10) Patent No.: US 10,427,319 B2
(45) Date of Patent: Oct. 1, 2019

(54) METHOD OF MANUFACTURING NATURAL CORK FILM

(71) Applicant: Seoyon E-Hwa Co., Ltd., Seoul (KR)

(72) Inventor: Su Wan Song, Gyeonggi-do (KR)

(73) Assignee: Seoyon E-Hwa Co., Ltd., Seoul (KR)

( * ) Notice: Subject to any disclaimer, the term of this patent is extended or adjusted under 35 U.S.C. 154(b) by 67 days.

(21) Appl. No.: 15/360,169

(22) Filed: Nov. 23, 2016

(65) Prior Publication Data

US 2018/0104944 A1    Apr. 19, 2018

(30) Foreign Application Priority Data

Oct. 14, 2016   (KR) .......................... 10-2016-0133801

(51) Int. Cl.
  *B27K 7/00*   (2006.01)
  *B32B 5/02*   (2006.01)
  (Continued)

(52) U.S. Cl.
  CPC ............... *B27K 7/00* (2013.01); *B32B 5/022* (2013.01); *B32B 9/02* (2013.01); *B32B 23/08* (2013.01); *B32B 37/12* (2013.01); *B32B 37/182* (2013.01); *B32B 38/0004* (2013.01); *B32B 38/0012* (2013.01); *B32B 38/162* (2013.01); *B32B 38/164* (2013.01); *D06N 3/00* (2013.01); *D06N 3/0061* (2013.01); *B32B 2038/0016* (2013.01); *B32B 2317/02* (2013.01)

(58) Field of Classification Search
  CPC .... D06N 3/0061; B32B 9/02; B32B 2317/02; B27K 7/00
  See application file for complete search history.

(56) References Cited

U.S. PATENT DOCUMENTS

| | | | |
|---|---|---|---|
| 2,960,382 A * | 11/1960 | Kelley ..................... | D06N 1/00 8/111 |
| 5,098,447 A | 3/1992 | Zucchini et al. | |
| 2016/0168274 A1* | 6/2016 | Hepworth ................ | C08H 8/00 |

FOREIGN PATENT DOCUMENTS

| | | | |
|---|---|---|---|
| AU | 9716560 A | * | 10/1997 |
| EP | 0322650 A1 | | 7/1989 |

(Continued)

OTHER PUBLICATIONS

Machine Translation for KR101274750 (Year: 2013).*

(Continued)

*Primary Examiner* — Christopher T Schatz
(74) *Attorney, Agent, or Firm* — Harness, Dickey & Pierce, P.L.C.

(57) ABSTRACT

Disclosed herein is a method of manufacturing a natural cork film, which includes forming a thin cork layer by slicing a prepared natural cork material, forming a fiber layer by attaching a fiber sheet to one surface of the cork layer formed in the forming a thin cork layer, pre-treating a lamination of the cork layer and the fiber layer formed in the forming a fiber layer, for preventing discoloration of the cork layer, and forming a resin layer by attaching a resin sheet to the fiber layer passing through the pre-treating a lamination of the cork layer and the fiber layer. Accordingly, it is possible to prevent the manufactured cork film from naturally discoloring due to light and to significantly reduce a phenomenon such as brittleness or wrinkling caused when the cork layer is decolorized alone.

14 Claims, 4 Drawing Sheets

(51) Int. Cl.
*B32B 23/08* (2006.01)
*B32B 37/12* (2006.01)
*B32B 37/18* (2006.01)
*B32B 38/00* (2006.01)
*B32B 38/16* (2006.01)
*B32B 9/02* (2006.01)
*D06N 3/00* (2006.01)

(56) References Cited

FOREIGN PATENT DOCUMENTS

| | | | | |
|---|---|---|---|---|
| EP | 3051023 | A1 | 8/2016 | |
| FR | 2569369 | A1 * | 2/1986 | ................ B27J 5/00 |
| JP | H01295801 | A | 11/1989 | |
| JP | 2002021305 | | 1/2002 | |
| KR | 860002103 | B1 | 11/1986 | |
| KR | 101274750 | B1 | 6/2013 | |
| KR | 101274752 | B1 | 6/2013 | |
| KR | 20150072553 | A | 6/2015 | |

OTHER PUBLICATIONS

Machine Translation of FR2569369 (Year: 1986).*
Korean Office Action in corresponding KR Serial No. 10-2016-0133801, dated by the KIPO on May 4, 2018.
European Search Report from EP 16200542.5 dated by the EPO on May 19, 2017.
Chinese Office Action in corresponding CN application serial No. 201611061951.5 dated Mar. 11, 2019.

* cited by examiner

METHOD OF MANUFACTURING NATURAL CORK FILM

CROSS-REFERENCE(S) TO RELATED APPLICATIONS

This application claims priority to Korean Patent Application No. 10-2016-0133801, filed on Oct. 14, 2016, the disclosure of which is incorporated herein by reference in its(their) entirety.

BACKGROUND OF THE INVENTION

Field of the Invention

Exemplary embodiments of the present invention relate to a method of manufacturing a natural cork film, and more particularly, to a method of manufacturing a natural cork film, capable of preventing a manufactured cork film from naturally discoloring due to light.

Description of the Related Art

Painting, metal plating, water transfer printing, etc. are conventionally used as methods of treating the surfaces of vehicle interior materials such as door trims, garnishes for instrument panels, and switch covers.

However, the painting, metal plating, and water transfer printing etc. among these surface treatment methods cause environmental pollution in the process of manufacturing products, and consistently generate organic compounds even after the finishing of products. Hence, the use of the surface treatment methods is increasingly narrowing down due to the regulation of VOCs (Volatile Organic Compounds) within the vehicle.

In recent years, there has been increasing interest in eco-friendly materials or processing methods thereof for environmental protection, and methods of forming natural material films by insert molding and of directly forming natural materials have been studied.

In this case, the method of directly forming natural materials is applied to some of luxury vehicles due to complicated processes and expensive prices.

Accordingly, a film insert molding method is actively studied as surface treatment methods which may give eco-friendly characteristics and aesthetic and luxurious feelings in products.

However, since the natural materials usable in the film insert molding method are consistently broken and cracked due to low tensile and flexural strengths which are the inherent properties thereof, there is a limit in applying the film insert molding method.

In order to resolve these problems, studies for manufacturing and using a natural cork film having high elasticity and flexibility are consistently carried out as disclosed in Korean Patent No. KR10-1274750 B1 (Patent Document 1), Korean Patent No. KR10-1274752 B1 (Patent Document 2), and Korean Patent Laid-open Publication No. KR10-2015-0072553 A (Patent Document 3).

However, the conventional methods of manufacturing natural cork films including Patent Documents 1 to 3 have a problem in that a manufactured cork film is naturally discolored due to light after a certain time because of lignin as the inherent ingredient of wood, which is contained in cork and causes discoloration.

In addition, the conventional methods of manufacturing natural cork films have a problem in that, since a cork layer is discolored alone in the process of decolorizing the cork layer for discoloration prevention, the cork layer is broken or wrinkled by impregnation and agitation of decolorant.

Moreover, the conventional methods of manufacturing natural cork films have a problem in that, in the laminating and forming a resin layer by hot pressure welding, the surface of a cork layer is carbonized when excessive heat is transferred thereto or the resin layer is separated when insufficient heat is transferred thereto.

Patent Document (Patent Document 1) Korean Patent No. KR10-1274750 B1
(Patent Document 2) Korean Patent No. KR10-1274752 B1
(Patent Document 3) Korean Patent Laid-open Publication No. KR10-2015-0072553 A

SUMMARY OF THE INVENTION

Accordingly, the present invention has been made in view of the above-mentioned problems, and an object thereof is to provide a method of manufacturing a natural cork film, capable of preventing a manufactured cork film from naturally discoloring due to light by removing lignin as the inherent ingredient of wood, which is contained in cork and causes discoloration, through a pre-treatment step.

Another object of the present invention is to provide a method of manufacturing a natural cork film, capable of significantly reducing a phenomenon such as brittleness or wrinkling caused when a cork layer is decolorized alone by attaching a fiber layer to the cork layer and then decolorizing the lamination thereof in a pre-treatment step.

A further object of the present invention is to provide a method of manufacturing a natural cork film, capable of efficiently laminating and forming a resin layer by hot pressure welding under a proper condition.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a method of manufacturing a natural cork film includes forming a thin cork layer by slicing a prepared natural cork material, forming a fiber layer by attaching a fiber sheet to one surface of the cork layer formed in the forming a thin cork layer, pre-treating a lamination of the cork layer and the fiber layer formed in the forming a fiber layer, for preventing discoloration of the cork layer, and forming a resin layer by attaching a resin sheet to the fiber layer passing through the pre-treating a lamination of the cork layer and the fiber layer.

In the forming a thin cork layer, the cork layer may have a thickness of 0.1 mm to 1.0 mm.

In the forming a thin cork layer, the natural cork material may be prepared by longitudinally or transversely separating cork extracted from a natural cork tree.

Alternatively, in the forming a thin cork layer, after a cork chip is formed by pulverizing cork extracted from a natural cork tree, the natural cork material may be prepared by mixing and pressing the cork chip and binder.

In the forming a fiber layer, the fiber layer may be formed by attaching the fiber sheet with adhesive or by hot pressure welding.

The pre-treating a lamination of the cork layer and the fiber layer may include decolorizing the cork layer of the lamination with a decolorant.

The decolorant may be a hydrogen peroxide diluted solution or a hydrogen peroxide diluted solution with ammonia.

The pre-treating a lamination of the cork layer and the fiber layer may include washing the lamination decolorized in the decolorizing the cork layer of the lamination, and drying the lamination washed in the washing the lamination.

In the forming a resin layer, the resin layer may be formed by attaching the resin sheet with adhesive.

Alternatively, in the forming a resin layer, the resin layer may be formed by attaching the resin sheet by hot pressure welding.

The hot pressure welding may be performed by roll pressing, and be performed at a temperature of 150° C. to 250° C., at a pressure of 0.1 MPa to 5 MPa, and at a movement speed of 0.5 m/min to 2 m/min.

The method may further include sanding the other surface of the cork layer passing through the forming a fiber layer before the pre-treating a lamination of the cork layer and the fiber layer after the forming a fiber layer.

The method may further include sanding the other surface of the cork layer after the pre-treating a lamination of the cork layer and the fiber layer.

In the sanding the other surface of the cork layer after the pre-treating a lamination of the cork layer and the fiber layer, the cork layer may have a thickness of 0.05 mm to 0.5 mm.

The method may further include forming a coating layer by attaching a color resin or a transparent resin with adhesive or by hot pressure welding or by painting a color resin or a transparent resin with a color paint or a transparent paint, after the pre-treating a lamination of the cork layer and the fiber layer.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The drawings are not necessarily to scale and in some instances, proportions may have been exaggerated in order to clearly illustrate features of the embodiments. In addition, the terms used in the specification are terms defined in consideration of functions of the present invention, and these terms may vary with the intention or practice of a user or an operator. Therefore, these terms should be defined based on the entire content disclosed herein. Meanwhile, the following embodiments are for the purpose of describing the components set forth in the appended claims only and are not intended to limit the spirit and scope of the invention.

Figure 1:
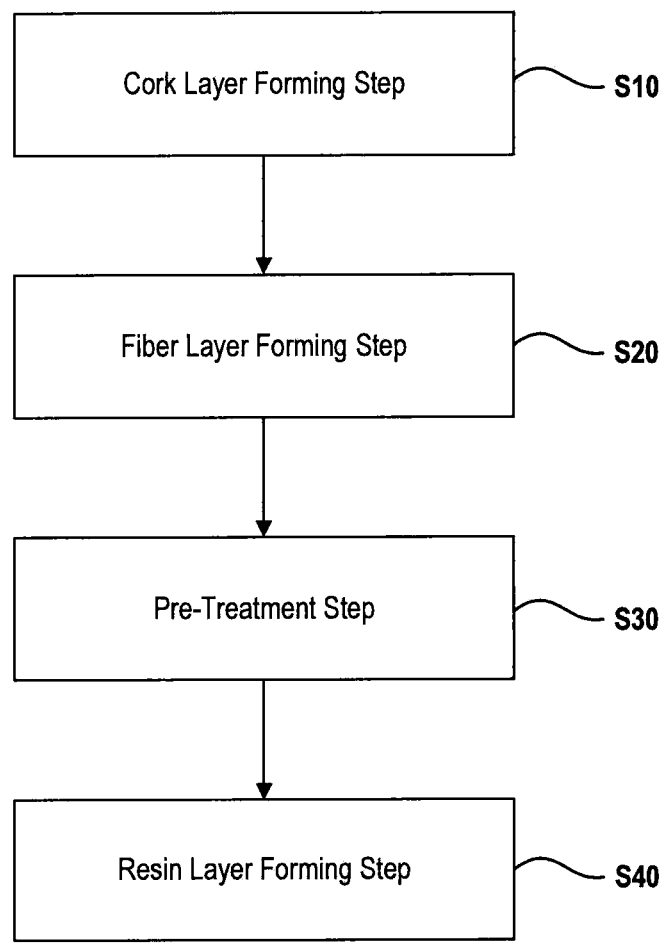
FIG. 1 is a flowchart for explaining a method of manufacturing a natural cork film according to an embodiment of the present invention.
Figure 2:
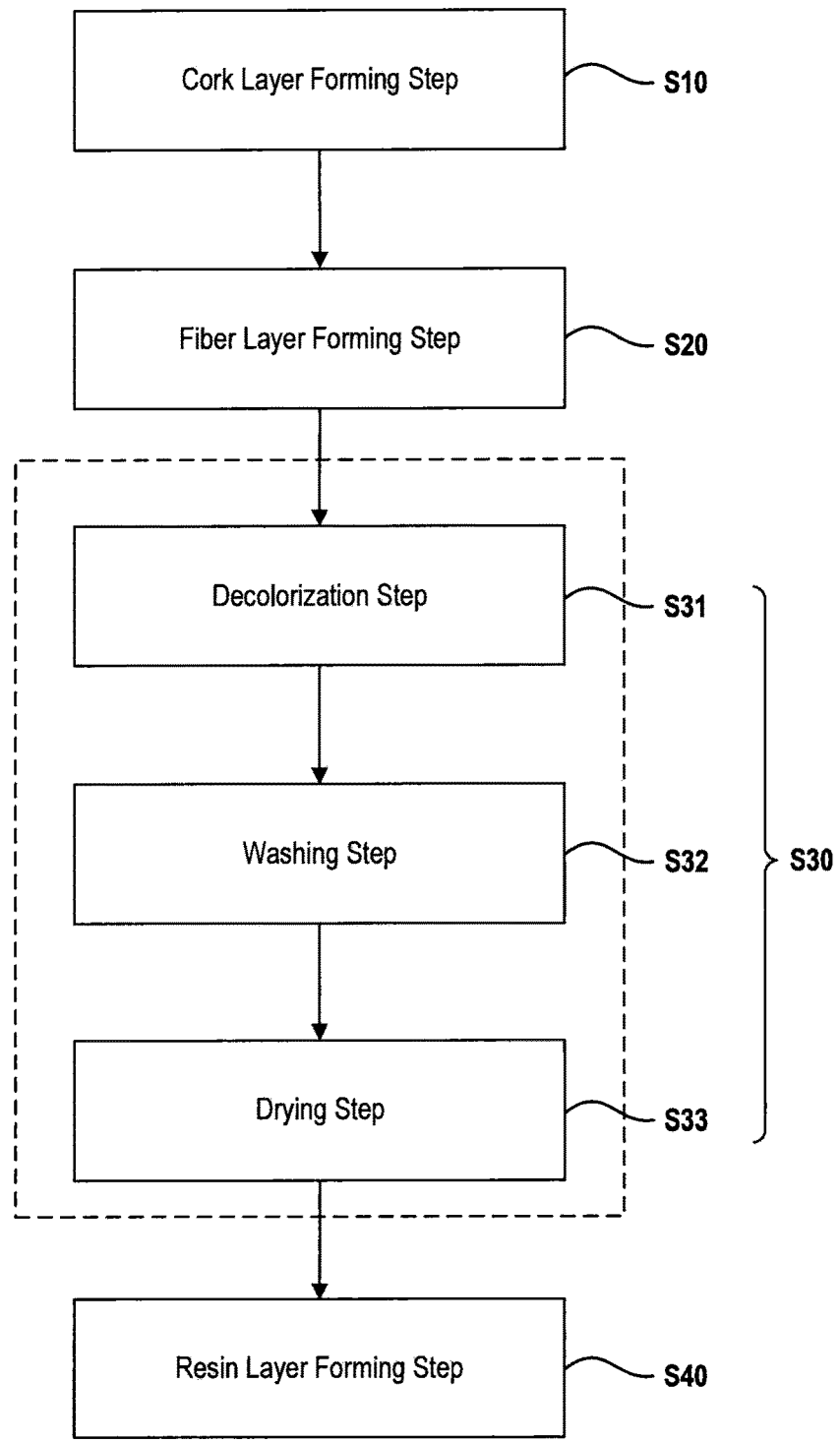
FIG. 2 is a flowchart for explaining a specific example in the pre-treatment step illustrated in FIG. 1.
Figure 3:
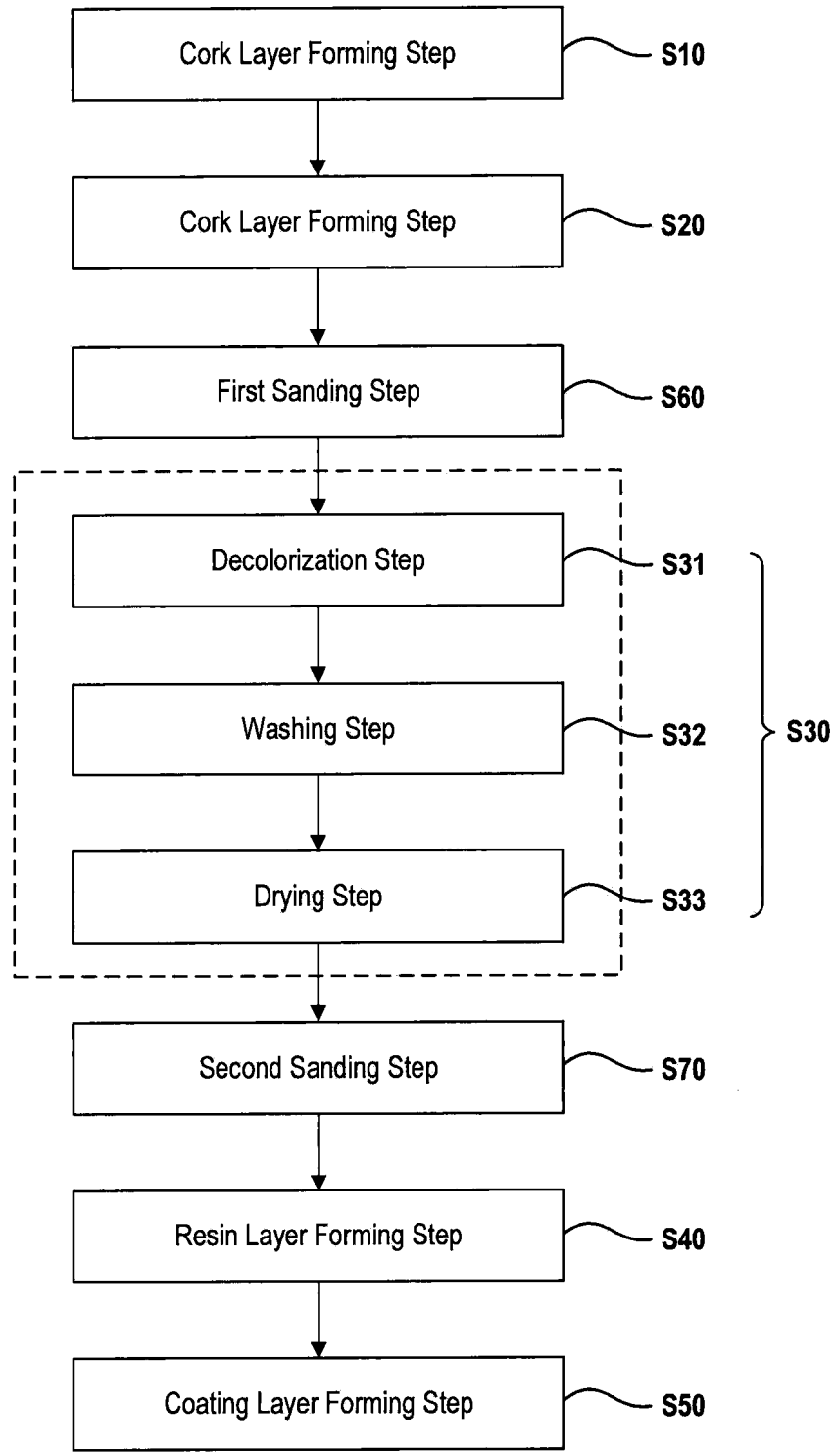
FIG. 3 is a flowchart for explaining a more specific example in the method of manufacturing a natural cork film illustrated in FIG. 2.
Figure 4:
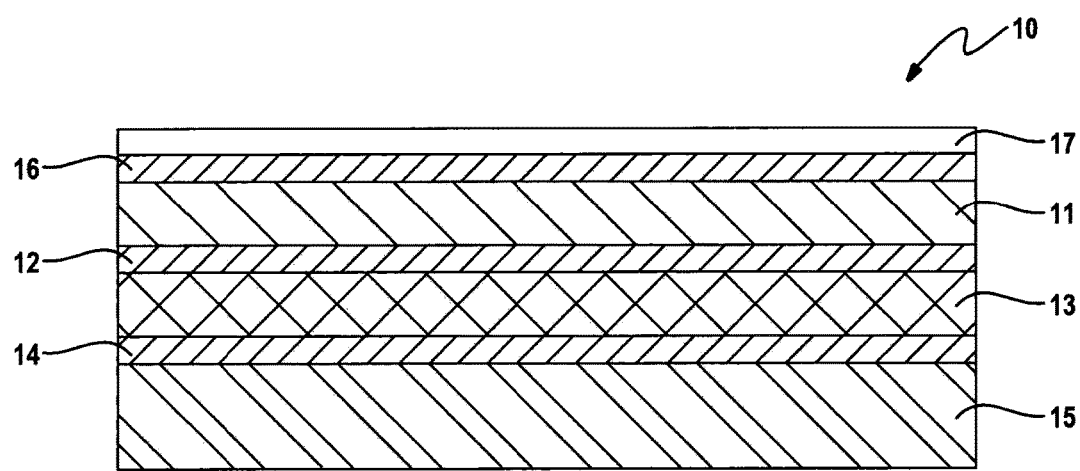
FIG. 4 is a cross-sectional view for explaining an example of a cork film manufactured by the method of manufacturing a natural cork film according to the embodiment of the present invention.

FIG. 1 is a flowchart for explaining a method of manufacturing a natural cork film according to an embodiment of the present invention. FIG. 2 is a flowchart for explaining a specific example in the pre-treatment step illustrated in FIG. 1. FIG. 3 is a flowchart for explaining a more specific example in the method of manufacturing a natural cork film illustrated in FIG. 2. FIG. 4 is a cross-sectional view for explaining an example of a cork film manufactured by the method of manufacturing a natural cork film according to the embodiment of the present invention.

Referring to FIGS. 1 to 4, the method of manufacturing a natural cork film according to the embodiment of the present invention includes a cork layer forming step S10, a fiber layer forming step S20, a pre-treatment step S30, and a resin layer forming step S40.

In this case, the method of manufacturing a natural cork film according to the embodiment of the present invention may further include at least one of a coating layer forming step S50, a first sanding step S60, and a second sanding step S70.

Hereinafter, the method of manufacturing a natural cork film according to the embodiment of the present invention will be described based on an example of a cork film 10 which is manufactured using the same and illustrated in FIG. 4.

The cork layer forming step S10 is a step of forming a thin cork layer 11 by slicing a prepared natural cork material.

In this case, the plate-shaped and thin cork layer 11 formed in the cork layer forming step preferably has a thickness of 0.1 mm to 1.0 mm. If the thickness of the cork layer 11 is less than 0.1 mm, the cork layer may not have wear resistance for undergoing the following steps due to deteriorated physical properties. If the thickness of the cork layer 11 exceeds 1.0 mm, a decolorization effect may be deteriorated since it is difficult to impregnate the cork layer with decolorant in the pre-treatment step S30 to be described.

Meanwhile, the natural cork material is a natural material and a protection tissue made in the vicinity of the stem or root of thickening growth plant. Since the natural cork material is made by dividing a cork formation layer, cells are regularly arranged in the natural cork material. Therefore, the natural cork material has excellent properties in terms of thermal insulation, soundproof, electric insulation, and elasticity. The whole plant including cork formation layers will be defined as a cork tree.

The cork layer forming step S10 may prepare a natural cork material by longitudinally or transversely separating cork extracted from a natural cork tree, and then slice the natural cork material.

Alternatively, the cork layer forming step S10 may form a cork chip by pulverizing cork extracted from a natural cork tree, and then prepare a natural cork material by mixing and pressing the cork chip and binder. Then, the cork layer forming step S10 may slice the natural cork material.

The fiber layer forming step S20 is a step of forming a fiber layer 13 by attaching a fiber sheet to one surface of the cork layer 11 formed in the cork layer forming step S10.

In this case, in the fiber layer forming step S20, the fiber layer 13 is preferably formed by attaching the fiber sheet with adhesive or by hot pressure welding. That is, the fiber layer 13 is attached to the cork layer 11 through a first adhesive layer 12.

Hereinafter, the layer structure formed of the fiber layer 13, the first adhesive layer 12, and the cork layer 11 will be referred to as a lamination.

Meanwhile, the fiber layer forming step S20 may be performed by roll pressing, using a plurality of known roll presses, which is one of the hot pressure welding methods.

The fiber layer 13 is a means for giving a certain strength to the cork layer 11, but is not limited to the material or shape thereof. Preferably, the fiber layer 13 is configured as a fiber or a non-woven fabric, which is made of nylon, acrylic, cotton, or polyurethane.

Preferably, the fiber layer 13 has a thickness of 0.1 mm to 1.0 mm in consideration of the formability of a cork film 10 which will be formed later.

Meanwhile, the adhesive layer 12 uses a TPU (Thermoplastic Poly Urethane) film in terms of cost-effectiveness, but the present invention is not limited thereto. That is, a general-purpose resin film, such as PE, PP, TPU, EVA, PES, or PA, which is called a hot-melt film, may be used, or a general adhesive film having adhesive strength at room temperature may be used. In addition, when there is a need for strong thermal stability and adhesive property, thermosetting resin such as epoxy resin, melamine resin, or polyurethane resin may also be used.

Preferably, the adhesive layer 12 has a thickness of 0.1 mm to 1.0 mm in consideration of the formability of a cork film 10 which will be formed later.

The first sanding step S60 is a step of sanding the other surface of the cork layer 11 passing through the fiber layer forming step S20 before the pre-treatment step S30 after the fiber layer forming step S20.

In this case, the sanding the other surface of the cork layer 11 may allow the other surface of the cork layer 11 to have improved surface uniformity. As a result, in the pre-treatment step S30, the cork layer 11 may be effectively impregnated with decolorant in a decolorization step S31, and the lamination may be effectively completed in washing and drying steps S32 and S33.

The pre-treatment step S30 is a step of pre-treating the lamination of the cork layer 11 and the fiber layer 13 formed in the fiber layer forming step S20, for preventing the discoloration of the cork layer 11.

In more detail, the pre-treatment step S30 is a step of decolorizing the lamination formed of the fiber layer 13, the first adhesive layer 12, and the cork layer 11. When the first sanding step S60 is further performed, the lamination, in which the other surface of the cork layer is sanded, is decolorized.

In this case, the pre-treatment step S30 may include a decolorization step S31 of decolorizing the cork layer 11 of the lamination with decolorant. In this case, the decolorization step S31 may be performed by impregnating the manufactured lamination, which is accommodated in a container having certain volume, with decolorant and agitating the lamination.

Any decolorant may be used as long as the cork film 10 may be decolorized as a desired color. Preferably, the decolorant is a hydrogen peroxide diluted solution or a hydrogen peroxide diluted solution with ammonia in consideration of productivity and costs.

When a hydrogen peroxide diluted solution made by mixing pure water and hydrogen peroxide is used as the decolorant, it is preferable that the hydrogen peroxide diluted solution include 20 to 50 wt % of hydrogen peroxide with respect to the total weight of the hydrogen peroxide diluted solution. If the hydrogen peroxide diluted solution includes less than 20 wt % of hydrogen peroxide, a decolorization effect may not be accomplished as desired. If the hydrogen peroxide diluted solution includes more than 50 wt % of hydrogen peroxide, the cork layer 11 may be excessively decolorized and damaged.

Meanwhile, when a hydrogen peroxide diluted solution with ammonia made by adding ammonia to the mixture of pure water and hydrogen peroxide is used as the decolorant, it is preferable that the weight ratio of ammonia and hydrogen peroxide is 1:20 to 1:5. This weight ratio considers a minimum requirement that allows ammonia to effectively increase the decolorization reaction rate of hydrogen peroxide and a limit requirement that allows the damage of the cork layer 11 due to the toxicity of ammonia itself to affect the product of the cork film 10.

Accordingly, the decolorization step S31 performs the process of artificially decolorizing the cork layer 11 with decolorant in order to prevent the cork film 10 from naturally discoloring due to light in the future.

In addition, the decolorization step S31 decolorizes the lamination, unlike existing methods. Therefore, it is possible to significantly reduce brittleness or wrinkling caused when the cork layer 11 is discolored alone.

Meanwhile, the pre-treatment step S30 may further include a washing step S32 of washing the lamination decolorized in the decolorization step S31, and a drying step S33 of drying the lamination washed in the washing step S32.

The washing step S32 is a step of removing the decolorant with which the cork layer 11 is impregnated. In this step, the process of immersing the lamination, which is decolorized with decolorant, in pure water accommodated in a certain container for a specific time, and of agitating the lamination is performed one to five times.

In this case, in order to further neutralize the decolorant, a predetermined neutralization agent for neutralizing the decolorant may be applied to the cork layer 11 during or before the washing step S32.

The drying step S33 is a step of removing moisture contained in the cork layer 11 in order to perform the following steps with respect to the washed lamination.

In this case, the drying step S33 may be performed at a specific drying temperature, preferably at a temperature of 10° C. to 50° C., and for a specific drying time, preferably for a time of 1 to 100 hours, in order to prevent the damage of the cork layer 11 and reduce a manufacturing time. If the drying temperature is less than 10° C., efficiency may be decreased due to a long drying time. If the drying temperature exceeds 50° C., the surface quality of the cork layer may be deteriorated since the surface of the cork layer 11 is wrinkled due to the rapid drying thereof. Therefore, the drying step S33 is preferably performed at a temperature of 10° C. to 50° C.

Meanwhile, although not shown, the present invention may further include a step of coloring the decolorized cork layer 11 using dye with a natural cork color or desired color.

The second sanding step S70 is a step of sanding the other surface of the cork layer 11 after the pre-treatment step S30.

In this case, the sanding the other surface of the cork layer 11 may allow the other surface of the cork layer 11, which is irregular by decolorizing of decolorant in the pre-treatment step S30, to have improved surface uniformity. As a result, the product of the cork film 10 may have integrity and a coating layer 17 may be effectively formed in a coating layer forming step S50 to be described later.

The second sanding step S70 is preferably performed before the resin layer forming step S40 after the pre-treatment step S30 since it is difficult to measure the thickness of the cork layer 11 because the thickness of the cork layer 11 is considerably reduced due to hot pressure welding and to sand the cork layer 11, after the resin layer forming step S40.

In this case, the second sanding step S70 is preferably performed such that the cork layer 11 has a thickness of 0.05 mm to 0.5 mm. If the thickness of the cork layer 11 is less than 0.05 mm, the cork film 10 may not have a cushion and the cork layer 11 may not have wear resistance due to deteriorated physical properties. If the thickness of the cork layer 11 exceeds 0.5 mm, the formability of the cork film 10 may be deteriorated and the efficiency of the adhesive process may be reduced when the coating layer 17 is formed.

The resin layer forming step S40 is a step of forming a resin layer 15 by attaching a resin sheet to the fiber layer 13 passing through the pre-treatment step S30.

In more detail, the resin layer forming step S40 is a step of attaching the resin layer 15 to the fiber layer 13 through a second adhesive layer 14. When the second sanding step S70 is further performed, the second sanding step S70 is performed in the state in which the other surface of the cork layer 11 is sanded.

The resin sheet is preferably made of ABS (Acrylonitrile Butadiene Styrene) resin, but the present invention is not limited thereto. The resin sheet may be made of thermoplastic resin such as polypropylene resin, polyethylene resin, polyacetal resin, nylon resin, styrene resin, or polycarbonate resin. In addition, the resin sheet may be made of thermosetting resin such as epoxy resin, melamine resin, or polyurethane resin.

In this case, the resin sheet preferably has a thickness of 0.1 mm to 1 mm, but the present invention is not limited thereto. If the thickness of the resin sheet is less than 0.1 mm, it is difficult to hold the shape of the product due to low flexural strength and hardness. If the thickness of the resin sheet exceeds 1 mm, the formability of the cork film 10 may be deteriorated.

Meanwhile, the adhesive layer 14 uses a TPU (Thermoplastic Poly Urethane) film in terms of cost-effectiveness, but the present invention is not limited thereto. That is, a general-purpose resin film, such as PE, PP, TPU, EVA, PES, or PA, which is called a hot-melt film, may be used, or a general adhesive film having adhesive strength at room temperature may be used. In addition, when there is a need for strong thermal stability and adhesive property, thermosetting resin such as epoxy resin, melamine resin, or polyurethane resin may also be used.

Preferably, the adhesive layer 14 has a thickness of 0.1 mm to 1.0 mm in consideration of the formability of the cork film 10 which will be formed later.

Meanwhile, in the resin layer forming step S40, the resin layer 15 is preferably formed by attaching the resin sheet with adhesive.

In addition, in the resin layer forming step S40, the resin layer 15 is preferably formed by attaching the resin sheet by hot pressure welding.

In this case, the resin layer forming step S40 may be performed by roll pressing, using a plurality of known roll presses, which is one of the hot pressure welding methods.

In this case, the hot pressure welding method is performed by roll pressing, and is preferably performed at a temperature of 150° C. to 250° C., at a pressure of 0.1 MPa to 5 MPa, and at a movement speed of 0.5 m/min to 2 m/min.

These conditions is conditions for performing roll pressing, which are experimentally derived in consideration of the carbonization prevention of the cork layer 11, the increase in the adhesive strength of the second adhesive layer 14, and the damage prevention of the fiber layer 13 and the resin layer 15. It can be experimentally seen that these conditions are conditions for improving the integrity and product of the cork film 10.

In more detail, the hot pressure welding method is preferably performed at a temperature of 150° C. to 250° C. If the hot pressure welding method is performed at a temperature less than 150° C., the adhesive strength between the fiber layer 13 and the resin layer 15 may not be formed as desired due to the melting temperature of the TPU film which is mainly used as the adhesive layer 14. If the hot pressure welding method is performed at a temperature more than 250° C., the surface of the cork layer 11 may be carbonized and the marketability thereof may be decreased.

In addition, the hot pressure welding method is preferably performed at a pressure of 0.1 MPa to 5 MPa. If the hot pressure welding method is performed at a pressure less than 0.1 MPa, the desired adhesive strength may not be formed since the adhesive layer 14, which is melted at high temperature, is not sufficiently infiltrated between the interfaces of the fiber layer 13 and the resin layer 15. If the hot pressure welding method is performed at a pressure more than 5 MPa, the surface of the cork layer 11 may be damaged due to excessive pressure.

In addition, the roll press preferably moves at a speed of 0.5 m/min to 2 m/min. If the roll press moves at a speed less than 0.5 m/min, the roll press may be stayed for a long time under high-temperature work environment, and for this reason, the surface of the cork layer 11 may be carbonized. If the roll press moves at a speed more than 2 m/min, it is difficult to transfer heat to the TPU film used as the adhesive film 14, and for this reason, the desired adhesive strength may not be formed.

Meanwhile, in addition to the conditions for performing roll pressing method, the surface quality of the cork layer 11 may be more increased using a specific roll press (a double belt roll press) which has a section for cooling an intermediate lamination (formed of the cork layer 11, the adhesive layer 12, the fiber layer 13, the adhesive layer 14, and the resin layer 15).

The coating layer forming step S50 is a step of forming a coating layer 17 by attaching color resin or transparent resin with adhesive or by hot pressure welding or by painting color resin or transparent resin with color paint or transparent paint, after the pre-treatment step S30.

In more detail, the coating layer forming step S50 is a step of attaching the coating layer 17 to the other surface of the cork layer 11 through a third adhesive layer 16. After the other surface of the cork layer 11 is sanded through the second sanding step S70 and the resin layer forming step S40 is further performed at high temperature and high pressure, the performing the coating layer forming step S50 is advantageous to the integrity of the coating layer 17.

The coating layer 17 may be made of thermoplastic resin or thermosetting resin such as polycarbonate resin, polyurethane resin, epoxy resin, ABS resin, polypropylene resin, polyethylene resin, or polyacetal resin. Particularly, the coating layer 17 may have a layer structure together with the cork layer 11 and the adhesive layer 16, by attaching thin color resin or transparent resin made of the above material with adhesive or by hot pressure welding. Furthermore, the coating layer 17 may be formed by applying liquid resin having the same material to the surface of the cork layer 11 and hardening the same.

Meanwhile, the adhesive layer 16 uses a TPU (Thermoplastic Poly Urethane) film in terms of cost-effectiveness, but the present invention is not limited thereto. That is, a general-purpose resin film, such as PE, PP, TPU, EVA, PES, or PA, which is called a hot-melt film, may be used, or a general adhesive film having adhesive strength at room temperature may be used. In addition, when there is a need for strong thermal stability and adhesive property, thermosetting resin such as epoxy resin, melamine resin, or polyurethane resin may also be used.

Preferably, the adhesive layer 16 has a thickness of 0.1 mm to 1.0 mm in consideration of the formability of a cork film 10 which will be formed later.

Meanwhile, the coating layer forming step S50 may be performed in a certain coating process such as applying and drying paint after a half-finished lamination (formed of the cork layer 11, the adhesive layer 12, the fiber layer 13, the adhesive layer 14, and the resin layer 15) completed till the resin layer forming step S40 is formed as a vehicle interior part by insert molding.

In addition, the coating layer forming step S50 may be performed in the process of applying a color layer to the other surface of the cork layer 11 as a desired color, and then drying the same, and in the process of again applying a transparent clear layer to the color layer for reinforcing surface physical properties, and then drying the same.

As described above, in accordance with the method of manufacturing a natural cork film according to the present invention, it is possible to prevent the cork film from naturally discoloring due to light by removing lignin through the pre-treatment step. Particularly, it is possible to significantly reduce a phenomenon such as brittleness or wrinkling caused when the cork layer is decolorized alone by attaching the fiber layer to the cork layer and then decolorizing the lamination thereof.

As is apparent from the above description, a method of manufacturing a natural cork film according to the present invention can prevent a manufactured cork film from naturally discoloring due to light by removing lignin as the inherent ingredient of wood, which is contained in cork and causes discoloration, through a pre-treatment step.

In addition, the method of manufacturing a natural cork film according to the present invention can significantly reduce a phenomenon such as brittleness or wrinkling caused when a cork layer is decolorized alone by attaching a fiber layer to the cork layer and then decolorizing the lamination thereof in the pre-treatment step.

Moreover, the method of manufacturing a natural cork film according to the present invention can efficiently laminate and form a resin layer by hot pressure welding under a proper condition.

The present invention relate to a method of manufacturing a natural cork film, and is applicable to industrial fields related to the surface treatment of vehicle interior parts.

While the present invention has been described with respect to the specific embodiments, it will be apparent to those skilled in the art that various changes and modifications may be made without departing from the spirit and scope of the invention as defined in the following claims.

What is claimed is:

1. A method of manufacturing a natural cork film, comprising:
   forming a cork layer by slicing a prepared natural cork material;
   forming a fiber layer by attaching a fiber sheet to one surface of the cork layer;
   pre-treating a lamination of the cork layer and the fiber layer for preventing discoloration of the cork layer; and
   forming a resin layer by attaching a resin sheet to the fiber layer during the pre-treating a lamination of the cork layer and the fiber layer step;
   wherein the pre-treating a lamination of the cork layer and the fiber layer step comprises decolorizing the cork layer of the lamination with a decolorant,
   wherein the decolorizing is performed by impregnating the lamination with decolorant and agitating, and
   wherein the decolorant is a hydrogen peroxide dilute solution comprising 20 wt. % to 50 wt. % of hydrogen peroxide with respect to a total weight of the hydrogen peroxide dilute solution wherein the hydrogen peroxide solution further comprises ammonia, and wherein a weight ratio ammonia to hydrogen peroxide is 1:20 to 1:5.

2. The method according to claim 1, wherein the cork layer has a thickness of 0.1 mm to 1.0 mm.

3. The method according to claim 1, wherein the prepared natural cork material is prepared by longitudinally or transversely separating cork from a natural cork tree.

4. The method according to claim 1, wherein a cork chip is formed by pulverizing cork extracted from a natural cork tree, and the prepared natural cork material is prepared by mixing and pressing the cork chip and a binder.

5. The method according to claim 1, wherein, the fiber sheet is attached to the one surface of the cork layer with an adhesive or by hot pressure welding.

6. The method according to claim 1, wherein the pre-treating a lamination of the cork layer and the fiber layer step comprises:
   washing the lamination decolorized in the decolorizing the cork layer of the lamination; and
   drying the lamination washed in the washing the lamination step.

7. The method according to claim 1, wherein the resin sheet is attached to the fiber layer with an adhesive.

8. The method according to claim 1, wherein, in the forming a resin layer step, the resin layer is formed by attaching the resin sheet by hot pressure welding.

9. The method according to claim 8, wherein the hot pressure welding is performed by roll pressing at a temperature of 150° C. to 250° C., at a pressure of 0.1 MPa to 5 MPa, and at a movement speed of 0.5 m/min to 2 m/min.

10. The method according to claim 1, further comprising, after the forming a fiber layer step and before the pre-treating a lamination of the cork layer and the fiber layer step, sanding an other surface of the cork layer, wherein the other surface of the cork layer opposes the one surface of the cork layer.

11. The method according to claim 1, further comprising, after the pre-treating a lamination of the cork layer and the fiber layer step, sanding an other surface of the cork layer, wherein the other surface of the cork layer opposes the one surface of the cork layer.

12. The method according to claim 11, wherein, in the sanding the other surface of the cork layer step, the cork layer has a thickness of 0.05 mm to 0.5 mm.

13. The method according to claim 1, further comprising forming a coating layer by attaching a color resin or a transparent resin with adhesive or by hot pressure welding or by painting a color resin or a transparent resin with a color paint or a transparent paint, after the pre-treating a lamination of the cork layer and the fiber layer step.

14. The method according to claim 7, wherein drying the lamination washed in the washing the lamination step includes heating the lamination to a temperature of 10° C. to 50° C. for a period of time of 1 hour to 100 hours.

* * * * *